United States Patent [19]

Chu et al.

[11] Patent Number: 5,187,707
[45] Date of Patent: Feb. 16, 1993

[54] PACKET DATA FLOW CONTROL FOR AN ISDN D-CHANNEL

[75] Inventors: Matthew C. H. Chu, Kanata; Chi-Vien Ly, Nepean; Gordon W. Coulson, Ottawa, all of Canada

[73] Assignee: Northern Telecom Limited, Montreal, Canada

[21] Appl. No.: 620,987

[22] Filed: Dec. 3, 1990

[51] Int. Cl.⁵ .............................................. H04J 3/26
[52] U.S. Cl. .................................... 370/79; 370/94.1
[58] Field of Search ................ 370/94.1, 60, 61, 68.1, 370/82, 79

[56] References Cited

U.S. PATENT DOCUMENTS

| | | | |
|---|---|---|---|
| 4,475,192 | 10/1984 | Fernow et al. | 370/94.1 |
| 4,677,616 | 6/1987 | Franklin | 370/94.1 |
| 4,727,537 | 2/1988 | Nichols | 370/94.1 |
| 4,769,810 | 9/1988 | Eckberg et al. | 370/94.1 |
| 4,769,811 | 9/1988 | Eckberg et al. | 370/94.1 |
| 4,839,891 | 6/1989 | Kobayashi et al. | 370/94 |
| 4,896,316 | 1/1990 | Lespagnol et al. | 370/60 |

Primary Examiner—Douglas W. Olms
Assistant Examiner—Melvin Marcelo
Attorney, Agent, or Firm—R. John Haley

[57] ABSTRACT

A plurality of terminals, each responsive to RR (receive ready) and RNR (receive not ready) messages for respectively enabling and inhibiting the transmission of data packets by the terminal, are coupled to a packet handler via a multiplexed path. In order to limit each terminal to an allocated bandwidth, for each terminal a number is stored representing a number of data bytes which the respective terminal is permitted to transmit within a timed period at its allocated bandwidth, and in each timed period a counter counts down from this number in accordance with the number of data bytes transmitted by the terminal. An RNR message is transmitted to the terminal if and when a zero count is reached, and following such an RNR message na RR message is transmitted to the terminal to enable it for the next time period. The arrangement provides a relatively instantaneous limiting of the bandwidth of each terminal to its allocated bandwidth, and can be applied independently for each direction of transmission.

10 Claims, 1 Drawing Sheet

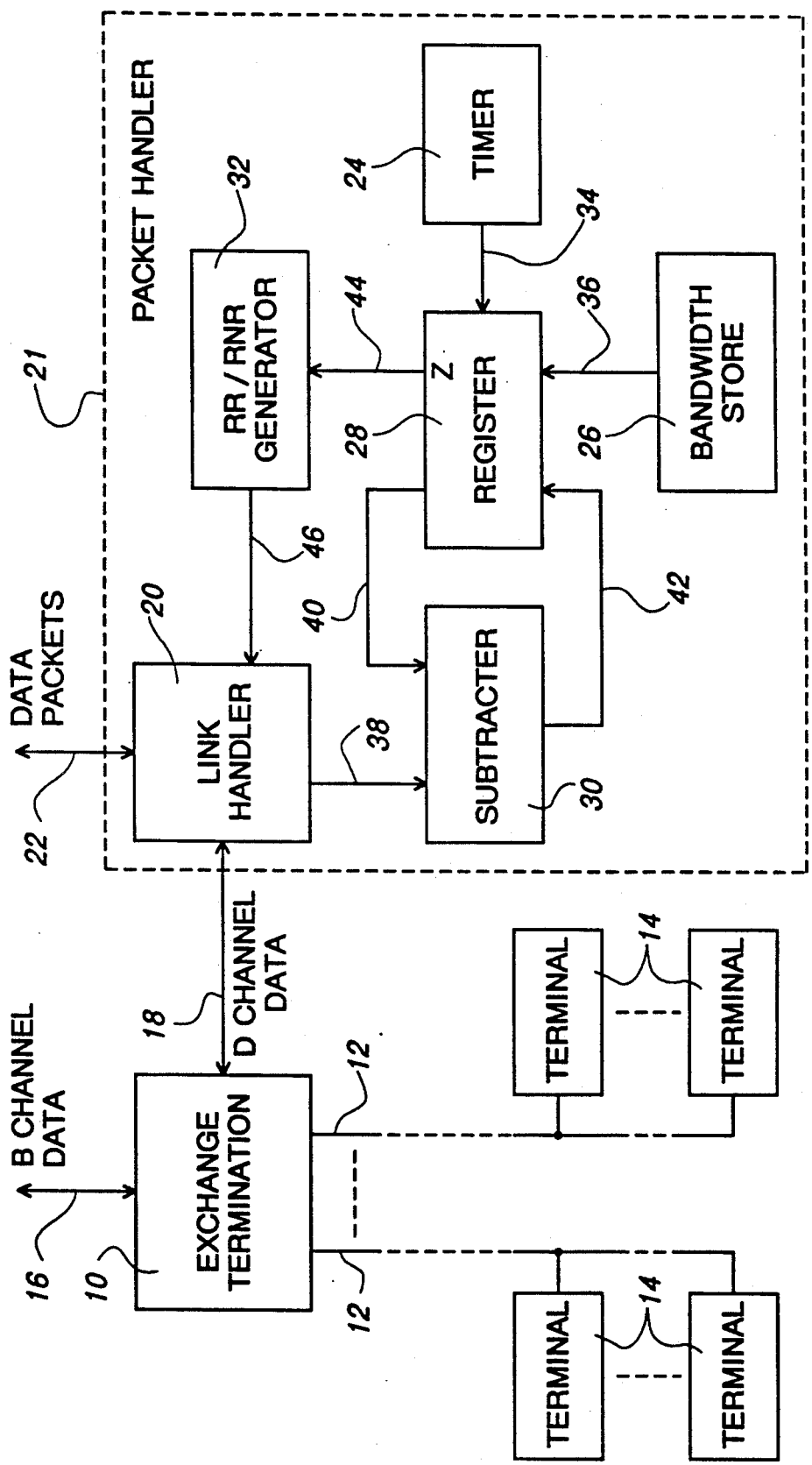

PACKET DATA FLOW CONTROL FOR AN ISDN D-CHANNEL

This invention relates to controlling the flow of data, in particular on an ISDN (integrated services digital network) D-channel which may be used in a multiplexed manner by a plurality of terminals.

BACKGROUND OF THE INVENTION

It is known to provide ISDN services to subscribers of a digital communications network. Such services generally comprise a combination of so-called B-channels and D-channels, which provide for data transmission rates of 64 kb/s (kilobits per second) and 16 kb/s respectively. For example, standard combinations of two B-channels and one D-channel (2B+D) and 23 B-channels and one D-channel (23B+D) are being adopted.

Each ISDN subscriber may have several terminals (for example a voice/data terminal, a personal computer, a printer, a facsimile machine, etc.) which it is desired be connected to an ISDN subscriber line for access to the D-channel, which terminals may have various different data communication bit rates up to the 16 kb/s bit rate which can be accommodated by the D-channel. It is desirable to permit such terminals to communicate simultaneously via the D-channel to the extent that its capacity is not exceeded.

In addition, it is known to multiplex the D-channel data from a plurality of subscribers for communication of such data via a link between an exchange termination, to which the individual ISDN subscriber lines are connected, and a packet handler or switch for handling the packetized data of the D-channels. For example, such a link may provide a 64 kb/s data channel to communicate this data between the exchange termination and the packet switch. With statistical multiplexing, such a 64 kb/s data channel may conveniently be intended for handling the D-channel data for a total of, for example, 64 subscriber terminals, each of which is allocated a bandwidth or data rate of 300 b/s (bits per second) to 16 kb/s.

A problem with such an arrangement is that there is currently no effective method of limiting the individual terminals to their allocated data rates. This can lead to a loss of revenues for the provider of the ISDN services, in that a subscriber may pay for only a low data rate (e.g. 300 b/s) while using a terminal with a higher data rate (e.g. 16 kb/s). In addition, such use of terminals with data rates higher than those which have been allocated can result in excessive data traffic on the packet data link between the exchange termination and the packet switch, resulting in excessive loss of data packets for all subscribers and disruption of the operation of the packet network. This is of particular concern for subscribers who subscribe to a high data rate or grade of service.

In U.S. Pat. No. 4,896,316, issued Jan. 23, 1990 to Lespagnol et al. and entitled "Method and System of Control of Flow of Data Packets", there is described a data packet flow control arrangement in which a number representing an allocated average packet flow rate for each virtual circuit is stored in a register. A counter is incremented at a fixed rate, and with each packet of the respective virtual circuit the stored number is subtracted from the count of the counter. A positive result is translated into an authorization to transmit, and a negative result is translated into a refusal of authorization to transmit, packets via the virtual circuit.

In this prior art arrangement, therefore, for each terminal using a virtual circuit, packet transmission rights are accumulated in the counter when the actual data flow rate is less than the allocated flow rate. In consequence, if a terminal is idle (transmits no packets) for a while, it can accumulate sufficient transmission rights to saturate the packet data link when it resumes transmitting packets. Thus although this prior art would limit an average data flow rate from each terminal, it fails to limit the instantaneous data flow rate of each terminal. This failure to limit the instantaneous flow rate of each terminal leaves a potential for the operation of one terminal to seriously degrade the bandwidth allocated for other terminals. Obviously, such degradation of allocated bandwidth should be avoided.

It is also known, for example from the discussion of prior art in U.S. Pat. No. 4,839,891 issued Jun. 13, 1989 to Kobayashi et al. and entitled "Method for Controlling Data Flow", to use RR (receive ready) and RNR (receive not ready) signalling to control the flow of data packets between terminals having different operating speeds, thereby to avoid overflow of a receive buffer in which received packets are stored. However, this prior art is concerned with avoiding undesired loss of data packets, and is not concerned with limiting the use by terminals, connected to a statistically multiplexed data link, of transmission rates higher than authorized.

An object of this invention, therefore, is to provide an improved method of and apparatus for controlling the flow of data, in particular on an ISDN D-channel which may be used in a multiplexed manner by a plurality of terminals.

SUMMARY OF THE INVENTION

According to one aspect of this invention there is provided a method of controlling the flow of data in packets from a terminal which is responsive to RR (receive ready) and RNR (receive not ready) messages for respectively enabling and inhibiting the transmission of packets by the terminal, comprising the steps of, at a packet handler to which the terminal transmits the data packets: providing in consecutive time periods a number representing an allocated number of data bytes which the terminal is permitted to transmit within each time period; in each time period, accumulating a count of data bytes transmitted by the terminal within the time period; in response to the accumulated count in any time period exceeding the provided number, transmitting an RNR message from the packet handler to the terminal; and in response to the end of each time period in which an RNR message is transmitted, transmitting an RR message from the packet handler to the terminal.

According to another aspect this invention provides a method of controlling the flow of data in packets from a plurality of terminals, each of which has a respective allocated bandwidth and is responsive to RR (receive ready) and RNR (receive not ready) messages for respectively enabling and inhibiting the transmission of packets by the terminal, to a packet handler via a multiplexed data packet transmission link, comprising the steps of, for each terminal: timing consecutive time periods; storing a number representing an allocated number of data bytes which the respective terminal is permitted to transmit, at its respective allocated bandwidth, within each time period; in each time period, loading a counter with the stored number and decrementing the counter by a count of data bytes transmitted by the respective terminal within the time period; in response to the contents of the counter reaching zero in any time period, transmitting an RNR message from the packet handler to the respective terminal; and in response to the end of each time period in which an RNR message is transmitted to the respective terminal, transmitting an RR message from the packet handler to the respective terminal.

Conveniently the consecutive time periods are provided commonly for the plurality of terminals, and comprise a fixed time period of approximately 15 seconds, although this period may easily be varied within any desired range, for example from 5 to 30 seconds.

The invention also extends to apparatus comprising a packet handler and a plurality of terminals, each responsive to RR (receive ready) and RNR (receive not ready) messages for respectively enabling and inhibiting the transmission of data packets by the terminal, coupled to the packet handler via a multiplexed data packet transmission link, the packet handler including: means for timing consecutive time period; means for storing for each terminal a number representing a number of data bytes which the respective terminal is permitted to transmit within each time period; means for accumulating in each time period a count of the number of data bytes transmitted by each terminal within the time period; means responsive to the accumulated count for each terminal reaching the stored number for the respective terminal for transmitting an RNR message via the packet handler to the respective terminal; and means responsive to the end of each time period for transmitting an RR message via the packet handler to each terminal to which an RNR message has been transmitted in the time period.

BRIEF DESCRIPTION OF THE DRAWING

The invention will be further understood from the following description with reference to the accompanying drawing, which schematically illustrates parts of a packet data flow control arrangement in accordance with an embodiment of the invention.

DESCRIPTION OF THE PREFERRED EMBODIMENT

Referring to the drawing, an exchange termination 10 is illustrated having connected to it a plurality of ISDN subscriber lines 12. Each ISDN subscriber line 12 has connected to it a plurality of terminals 14 and serves to carry digital telecommunications services in each direction between these terminals and the exchange termination. These services for example comprise, for each direction of transmission, two so-called B-channels each providing a bit rate of 64 kb/s and one D-channel providing a bit rate of 16 kb/s.

The information on the B-channels can be of known form, for example comprising digital speech signals from a telephone constituting one of the terminals 14, and is passed in known manner by the exchange termination 10 to a link 16 to other equipment, such as a public switched telephone network (not shown), for handling this information in known manner. As the present invention is not concerned with this information, it is not discussed further here.

As is known, the information on the D-channel is carried in data packets each with a header including an identification of the terminal 14 to which the packet relates. A single D-channel can carry multiplexed data packets for up to eight terminals, so that there may be eight terminals 14 connected to each line 12. The exchange termination 10, in known manner, statistically multiplexes the D-channel data packets from a plurality of the subscriber lines 12 and supplies them via a packet data link 18 to a packet data link handler 20. The link handler 20 is part of a packet handler 21, illustrated within a broken line box in the drawing, which serves in known manner to pass the packets to a link 22 to a packet-switched public data network (not shown) of known form.

For a further description of known parts of the arrangement of the drawing, reference is directed for example to Telesis, Volume 13, Number 3, 1986, published by Bell-Northern Research Ltd., and especially an article at pages 4 to 13 thereof entitled "Implementation of ISDN" by Cho Lun Wong and Rob Wood.

By way of example, the packet data link 18 may be provided with a bit rate of 64 kb/s for each transmission direction for accommodating the statistically multiplexed D-channel data for up to for example 64 individual terminals 14, also referred to as logical links, each of which is identified by a respective terminal identifier or address. Each terminal 14 or logical link may be allocated a respective bandwidth or data rate, in accordance with which the statistical multiplexing is designed to avoid overloading of the data link 18, and also of the D-channel on each ISDN subscriber line 12. In the event of such overloading, excessive numbers of data packets are lost due to a shortage of the capacity especially of the data link 18, and retransmission of such packets results in further overloading so that all of the communications via this link 18 can be disrupted.

Each terminal 14 may conveniently be allocated any one of for example six possible bandwidths, such as the relatively standard bandwidths of 300, 1200, 2400, 4800, 9600, and 16000 b/s, the last of these bandwidths being the full capacity of the D-channel. For simplicity in the following description, the remaining parts of the arrangement shown in the drawing are described as serving to limit the flow of data in only one direction, from any individual terminal 14, to substantially its allocated bandwidth, so that overloading of the data link 18 due to a terminal transmitting data at a higher rate than that which is allocated is effectively avoided. This also enables a provider of the ISDN services to set and enforce different tariffs for the respective bandwidths, so that for example a subscriber having only low-speed data terminals connected to a line 12 can pay less than a subscriber using high-speed terminals.

Thus the following description relates only to the transmission of data in the upstream direction from the terminals 14 to the packet handler 21. For data flow in the opposite, or downstream, direction, similar measures can be used to limit data rates to those allocated for the terminals, so that overloading of the data link 18 in the downstream direction is easily avoided. For each terminal, the flow control for the two directions of transmission can be handled in a similar but independent manner.

The remaining parts of the arrangement shown in the drawing comprise a timer 24, a bandwidth store 26, a down counter which is constituted by a register 28 and a subtracter 30, and a RR/RNR message generator 32 which serves for generating receive ready (RR) and receive not ready (RNR) messages for a respective terminal 14. The form of such a generator is known in itself, as it is known to provide RR and RNR messages to a terminal to control its data flow rate to avoid overflow of a receive data buffer, as discussed in the introduction. The functions of the components 26, 28, 30, and 32 are provided individually for each terminal 14 or logical link; the timer 24 can serve simultaneously for all of the terminals 14 or logical links.

In the bandwidth store 26 a number is stored which represents the number of bytes which, at the allocated bandwidth or bit rate of the respective terminal 14, the terminal is permitted to transmit within a prescribed time period for which the timer 24 is set. This period is assumed here to be 15 seconds, this being a convenient time period, but it may alternatively be shorter or longer depending upon particular requirements. Periodically with this 15-second period, the timer 24 supplies to the register 28 via a line 34 a signal which causes the register 28 to be loaded via lines 36 with the number stored in the bandwidth store 26. For the 15-second period and the bit rates of 300 to 16000 b/s given above, the bandwidth store 26 would be loaded with byte counts of 563, 2250, 4500, 9000, 18000, and 30000 respectively. The bandwidth store 26 and the down counter components 28 and 30 can thus conveniently operate with 16-bit integers.

For each data packet received from a terminal 14 or logical link via the data link 18, the link handler 20 counts data bytes to provide a count of the number of information bytes in the packet, and supplies this via lines 38 to the subtracter 30 associated with the respective terminal, as identified by the terminal address or identifier in the packet header. The subtracter 30 subtracts this number on the lines 38 from the current count contained in the register 28, with which it is supplied via lines 40, and stores the result of the subtraction, or zero if the result is less than zero, as an updated count in the register 28 via lines 42.

The generator 32 is controlled via an output Z of the register 28 and a line 44 to generate an RNR message when the count contained in the register 28 changes from being greater than zero to zero, and to generate an RR message when the count contained in the register 28 changes from being zero to being greater than zero, this happening in response to the end of a timer period (when the register 28 is reloaded) in which an RNR message has been generated. The respective generated message, in a packet with a header identifying the respective terminal 14 to which it relates, is supplied via a line 46 to the link handler 20 and thence to the respective terminal 14. Thus the transmission of data packets by each terminal 14 is inhibited by an RNR message when the register 28 for the respective terminal contains a zero count, and is enabled again by an RR message with the start of the next timer period.

From the foregoing description it can be seen that, within each 15-second period of the timer 24, each terminal 14 is enabled, by the RR and RNR messages with which it is supplied in this or a previous timer period, from the respective generator 32, to transmit only that number of bytes of information which it is allocated by the value stored in the respective bandwidth store 26. As the terminal transmits packets of data, the number of bytes in each packet is subtracted from the count in the register 28, until either a zero count is reached as described above or the register 28 is reloaded with the value from the store 26 at the start of the next 15-second period timed by the timer 24. In the former case the terminal is supplied with an RNR message and hence is inhibited from transmitting further data packets until the start of the next 15-second period, when the register 28 is reloaded and the generator 32 sends an RR message to the terminal; thus the terminal is limited to substantially its allocated bandwidth. In the latter case, the terminal is transmitting at no more than its allocated bandwidth (on average over the 15-second period), so that no messages are sent to the terminal from the generator 32 and the terminal remains enabled.

In general, in each 15-second period the last packet which a terminal 14, transmitting at a higher-than-allocated rate, transmits before it is supplied with an RNR message will contain more bytes than are needed to reduce the current count in the respective register 28 to zero. Especially in order to accommodate low-speed data terminals, this packet is not suppressed in the link handler 20 but is supplied to the link 22 in conventional manner. This means that each terminal 14 can in fact transmit at a slightly higher data rate than that allocated, with a margin which is dependent upon factors including the packet size, the allocated transmission rate, and the timer period.

For example, a terminal which is allocated a 300 b/s rate, transmitting 256-byte packets, is actually enabled to transmit three packets during each 15-second period as discussed above, because the contents of the register 28 only become zero with the third packet. Thus such a terminal could actually transmit 768 data bytes in each 15-second period, and could have a data rate of about 410 b/s, without being inhibited by an RNR message. However, this extra bandwidth is very small compared with the total bandwidth of the D-channel, and is relatively insignificant. Furthermore, this margin is less for faster allocated bit rates (assuming a fixed maximum number of data bytes per packet), and can also be reduced by selecting a different timer period.

It should be appreciated that in the above arrangement each terminal 14 can, at the start of each timer period, transmit data at a higher rate than it is allocated, up to the maximum rate of 16000 b/s afforded by the D-channel, until it is inhibited for the remainder of the timer period. This can be advantageous for a terminal only occasionally transmitting small amounts of data. However, a terminal attempting to operate continuously at a higher-than-allocated rate will be subject to serious performance degradation. For example, if a terminal which is allocated a 1200 b/s bandwidth attempts to scroll a data file on a screen at a rate of 9600 b/s, then the scrolling will proceed at 9600 b/s for about 1.9 seconds, whereupon the terminal will then be idle for the remaining 13.1 seconds of the 15-second period. The 15-second period could, of course, be changed to modify the actual scrolling and waiting times if desired, without changing the allocated bandwidth.

In conjunction with the above, it follows that at the start of each 15-second period several terminals may simultaneously start to transmit at higher-than-allocated rates, resulting in a temporary overload of the data link 18. In order to avoid this, the timer 24 can be arranged to start the 15-second period for different terminals 14 at different times, for example offset from one another by about one-quarter second intervals, and/or separate timers can be provided for different terminals.

In the above respect it should also be noted that, rather than storing in the bandwidth store 26 the number of bytes allocated for the respective terminal 14 within a fixed period set by the timer 24, the register 28 could be loaded with a fixed number and the period timed by the timer 24 could be varied, depending on the allocated bandwidth of the respective terminal, to achieve substantially the same result. Alternatively, a combination of different timer periods and different stored bandwidths could be used for different terminals.

Although the above description refers to discrete blocks for the functions of the components 24, 26, 28, 30, and 32, it should also be appreciated that the functions of these components may alternatively be provided in a convenient manner in software, operating on memory locations with stored values, to achieve the same results.

Numerous other modifications, variations, and adaptations may be made to the described embodiment without departing from the scope of the invention as defined in the claims.

What is claimed is:

1. A method of controlling the flow of data in packets from a terminal which is responsive to RR (receive ready) and RNR (receive not ready) messages for respectively enabling and inhibiting the transmission of packets by the terminal, comprising the steps of, at a packet handler to which the terminal transmits the data packets:

providing in consecutive time periods a number representing an allocated number of data bytes which the terminal is permitted to transmit within each time period;

in each time period, accumulating a count of data bytes transmitted by the terminal within the time period;

in response to the accumulated count in any time period exceeding the provided number, transmitting an RNR message from the packet handler to the terminal; and in response to the end of each time period in which an RNR message is transmitted, transmitting an RR message from the packet handler to the terminal.

2. A method as claimed in claim 1 wherein the time periods comprise a fixed time period and the step of providing a number representing an allocated number of data bytes which the terminal is permitted to transmit within each time period comprises storing the number in a bandwidth store of the packet handler.

3. A method as claimed in claim 1 wherein the step of accumulating a count of data bytes transmitted by the terminal within the time period comprises loading a count register with the provided number at the start of each time period, and within the time period subtracting from the contents of the count register a number of data bytes in each packet transmitted by the terminal.

4. A method as claimed in claim 3 wherein the RNR message is transmitted from the packet handler to the terminal in response to the contents of the count register not being greater than zero.

5. A method of controlling the flow of data in packets from a plurality of terminals, each of which has a respective allocated bandwidth and is responsive to RR (receive ready) and RNR (receive not ready) messages for respectively enabling and inhibiting the transmission of packets by the terminal, to a packet handler via a multiplexed data packet transmission link, comprising the steps of at the packet handler and, for each terminal:

timing consecutive time periods;

storing a number representing an allocated number of data bytes which the respective terminal is permitted to transmit, at its respective allocated bandwidth, within each time period;

in each time period, loading a counter with the stored number and decrementing the counter by a count of data bytes transmitted by the respective terminal within the time period;

in response to the contents of the counter reaching zero in any time period, transmitting an RNR message from the packet handler to the respective terminal; and in response to the end of each time period in which an RNR message is transmitted to the respective terminal, transmitting an RR message from the packet handler to the respective terminal.

6. A method as claimed in claim 5 wherein the consecutive time periods are provided commonly for the plurality of terminals.

7. A method as claimed in claim 6 wherein the consecutive time periods comprise a fixed time period of approximately 15 seconds.

8. A method as claimed in claim 5 wherein the respective allocated bandwidths comprise a plurality of predetemined bandwidths up to 16000 b/s.

9. Apparatus comprising a packet handler and a plurality of terminals, each responsive to RR (receive ready) and RNR (receive not ready) messages for respectively enabling and inhibiting the transmission of data packets by the terminal, coupled to the packet handler via a multiplexed data packet transmission link, the packet handler including:

means for timing consecutive time periods;

means for storing for each terminal a number representing a number of data bytes which the respective terminal is permitted to transmit within each time period;

means for accumulating in each time period a count of the number of data bytes transmitted by each terminal within the time period;

means responsive to the accumulated count for each terminal reaching the stored number for the respective terminal for transmitting an RNR message via the packet handler to the respective terminal; and means responsive to the end of each time period for transmitting an RR message via the packet handler to each terminal to which an RNR message has been transmitted in the time period.

10. Apparatus as claimed in claim 9 wherein the means for accumulating a count comprises down counter means arranged to be loaded with the stored number for the respective terminal at the start of each time period.

* * * * *